Figure 1:
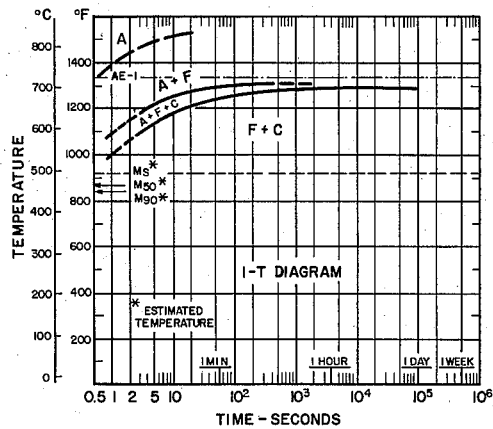

Sept. 10, 1963 R. L. RECTENWALD 3,103,065
CYCLIC ARC WELDING
Filed March 7, 1961 2 Sheets-Sheet 1

INVENTOR.
Richard L. Rectenwald
BY William B. Jaspert
Attorney.

INVENTOR.
Richard L. Rectenwald
BY William B. Jaspert.
Attorney.

NOTE:
① INDICATES FIRST WELDING & FIRST STRESS RELIEF CYCLE AT 1150° F. THIS TAKES APPROX. 4 HRS. FOR STRESS RELIEF.
② SHOWS SECOND WELDING & STRESS RELIEF CYCLE – APPROX. 8 HRS.
③ SHOWS THIRD WELDING & STRESS RELIEF CYCLE – APPROX. 12 HRS.
④ SHOWS FOURTH WELDING & STRESS RELIEF CYCLE – APPROX. 14 HRS.

United States Patent Office

3,103,065
Patented Sept. 10, 1963

3,103,065
CYCLIC ARC WELDING
Richard L. Rectenwald, Pittsburgh, Pa.
Filed Mar. 7, 1961, Ser. No. 93,926
6 Claims. (Cl. 29—401)

This invention relates to new and useful improvements in fusion arc welding of steel castings or forgings and the present application is a continuation-in-part of application serially numbered 706,282 filed December 31, 1957 entitled "Cyclic Arc Welding," now abandoned.

In accordance with the present invention, the weld metal is selected to approximate the physical and chemical properties of the parent metal as distinguished from brazing with non-ferrous metals.

It is among the objects of the invention to provide a method of welding that is unlimited as to mass of weld metal deposit, the thickness of the joined members, and the alloy composition of the parent metal.

It is a further object of the invention to control the microstructures and physical properties of the weld deposit and heat affected areas of parent metal by preheating the members to be welded and by combining a selected preheat temperature with selected welding temperatures, and then stress relieving the weld by selected stress relieving or annealing temperatures in a definite sequence of operations.

Another object of the invention is the selection of preheat temperatures, cooling rates and welding temperatures in accordance with isothermal transformation diagrams of the ferrous alloys commonly used in heavy machine castings and forgings which are in the category of hypoeutectoid steels having a carbon content of 0.80% and under.

It is still a further object of the invention to weld massive sections in block welding sequence with precise preheat temperature and with continuous and repeated stress relief to provide a fool-proof weld which, when completed, is heated to a final stress relief or normalizing temperature and cooled slowly to room temperature.

Figure 2:
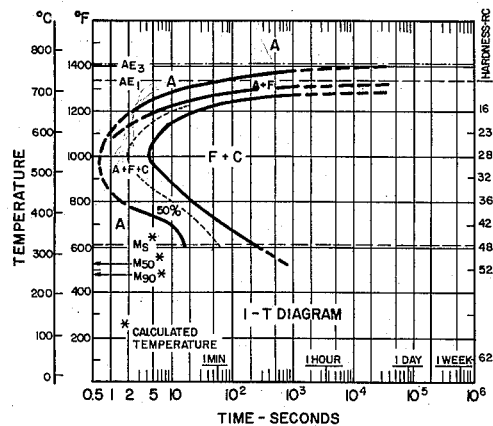
Figure 3:
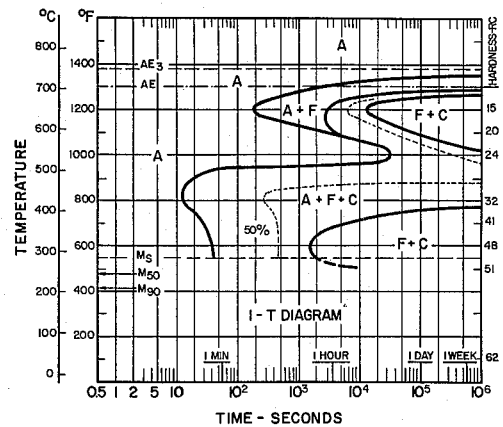
Figure 4:
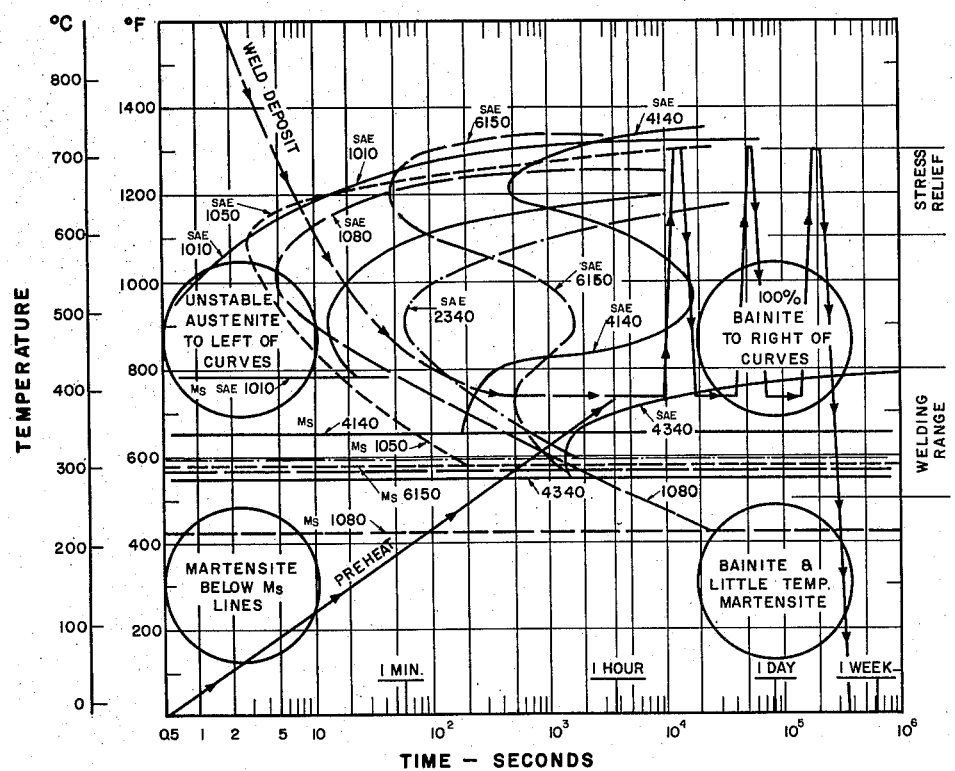
Figure 5:
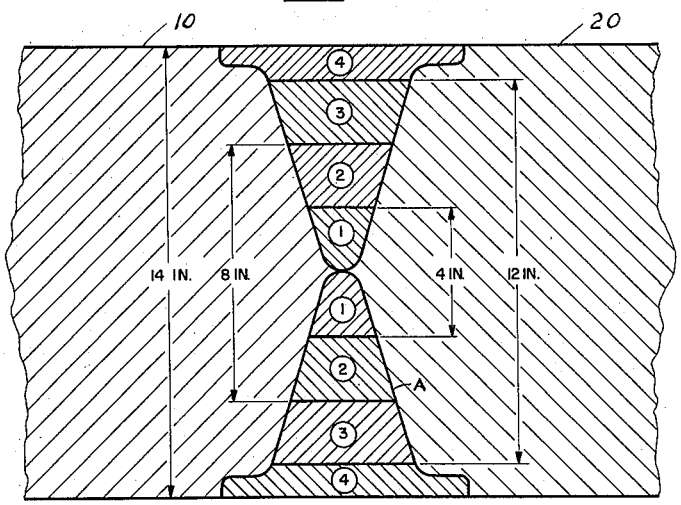

These and other objects of the invention will become more apparent from a consideration of the accompanying graphs constituting a part hereof in which like reference characters designate like parts and in which:

FIGURE 1 is an isothermal transformation (I-T) diagram for AISI–1008 steel illustrating transformation behavior of shallow hardening steel;

FIGURE 2 a similar (I-T) diagram for SAE 1050 steel showing medium hardening behavior at slower cooling rates;

FIGURE 3 an (I-T) for SAE 4340 steel showing slowest transformation time for deep hardening steel;

FIGURE 4 an isothermal welding diagram for common alloy steels showing controlled heating and cooling rates for cyclic welding; and, FIGURE 5 is a vertical section diagrammatically illustrating the block welding sequence of applicant's cyclic welding method.

Most heavy machine castings and forgings are classified as hypoeutectoid steels having a carbon content of 0.80% and under and over the past decade, extensive research has been conducted by the Fundamental Research Center of the U.S. Steel Corporation to provide background information which is useful in the metallurgy of welding. This information, in part, consists of isothermal transformation diagrams, FIGURES 1, 2 and 3 of the drawings, for practically all ferrous alloys manufactured today. These diagrams give the effect of cooling rates on the micro structure of plain carbon and alloy steels from the upper critical temperature to atmospheric temperature. These diagrams are plotted with temperature as the ordinate on a uniform scale, and time an extended logarithmic scale as the abscissa. A typical I-T diagram for a mild steel of 0.08 carbon steel, FIGURE 1, shows effect of cooling rate on a nonhardening steel. FIGURE 2 illustrates the behavior of an intermediate hardening steel of 0.50 carbon. The susceptibility to hardening at slower cooling rates is shown in FIGURE 3 which represents the I-T conditions for a deep hardening SAE 4340 steel.

Attention is called to the horizontal line marked $M_s$ on the diagram which shows the temperature at which austenite begins to transform to martensite. $M_{50}$ and $M_{90}$ designate the temperatures at which the transformation is either 50 percent complete or 90 percent complete in this order. It should be emphasized that the transformation to martensite can only proceed from the austenite (A) constituent and not from ferrite (F) or carbide (C) but to some degree from combinations of these phases as transformation approaches bainite. Therefore, in order to form 100 percent martensite in the SAE 1050 steel, FIGURE 2, the austenite (A) phase must be cooled from above the upper critical $A_{e3}$ temperature in less than 10 seconds to a temperature below $M_s$ of about 600 F. A slower cooling rate of an hour or more would cause the transformation to proceed to the ferrite plus carbide (F+C) area and avoid formation of martensite below the $M_s$ temperature. If by chance the ideal cooling rates were not attained and some martensite was formed, the steel could be reheated to a temperature just below the lower critical $A_{e1}$ to accomplish complete relief of residual thermal stresses and tempering of the martensite.

Reference to FIGURE 1 for the AISI 1008 steel indicates that the dotted (calculated) portion of the 100 percent transformation curve would cross the $M_s$ line at about zero time showing that martensite could hardly could hardly be formed if the quenching time was instantaneous. Similar comparison to FIGURE 3 for the SAE 4340 curve shows that martensite would form upon cooling from A, to below $M_s$ (550 F.) at any rate up to about one hr.

Above the $A_1$ lower critical temperature austenite is in a solid solution stable phase. As temperature decreases below $A_1$ (approximately 1350 F. for SAE 1950) transformation begins by precipitation of carbides, and a series of different microstructures are formed which possess a wide variety of physical properties. These microstructures are listed in Table I with approximate transformation temperatures and physical properties of a typical SAE 1050 steel which are significant in the welding process.

The preceding data describes the manner in which the microstructures of the weld deposit and heat affected areas of parent metal vary with temperature changes encountered during welding. It is evident that the isothermal transformation diagrams can be used as a guide in selecting preheat temperatures, cooling rates and welding temperatures to produce the most desirable microstructures and physical properties during and following welding. To control these conditions ideally, the exact chemical composition, grain size and previous heat treatment of each piece to be welded must be known.

In studying the complete scope of the variables within the range of hypoeutectic steels of less than 0.80 percent carbon, it is possible to superimpose the various transformation diagrams into one diagram which provides all of the information needed for welding a wide range of common alloy steels. This diagram is similar to the continuous cooling transformation diagram and it shall be called an "isothermal welding diagram" for lack of a better name, FIGURE 4. The approximate preheat curve and weld deposit cooling curve has been plotted on the diagram to illustrate the present welding procedure named the "cyclic welding method." In developing the welding diagram, the lowest preheat temperature has been set 50 to 100 F. above the highest $M_s$ temperature for the group of alloys. By retarding the weld deposit cooling rate past the nose of the transformation curves (1400 to 1000 F.) to a minute or slower, the transformation of austenite proceeds to bainite if the preheat temperature is held an hour or more. To this point, the weld has been accomplished without formation of untempered martensite which is the most crack sensitive structural phase of the welding cycle. The welding proceeds with high heat input in block welding sequence until a predetermined thickness, 1 to 3 in., of weld metal is deposited.

The block welding helps to retard cooling rates above the $M_s$ line. When the desired thickness of each step of welding is attained, the temperature of the entire cross section of weld and parent metal is raised to the stress relieving range of 1150 to 1250 F. This treatment relieves all residual thermal stresses produced by shrinkage of weld metal, it refines the grain structure and tempers any martensite which may have formed accidentally. The section is cooled slowly to the preheat level $M_s+100$ F., and the welding cycle is repeated until the desired thickness increment is reached again followed by stress relief. This welding and stress relieving sequence is repeated until the entire mass of weld metal has been deposited to any desired thickness. After the weld is completed, the entire section is stress relieved or normalized the last time and cooled slowly to room temperature.

Several observations should be made at this point which reconcile the hazards anticipated at the beginning of the cyclic welding development:

All welding is performed at selected temperatures and at cooling rates to avoid formation of brittle martensite.

The entire section is repeatedly stress relieved to avoid fractures due to shrinkage opposed by rigid restraint.

Low hydrogen electrodes are selected to avoid hydrogen embrittlement.

Electrodes are selected which do not contain excessive amounts of elements (principally vanadium) which may result in autocracking, age hardening or precipitation hardness at elevated temperatures.

Underbead cracking is avoided by eliminating untempered martensite and by minimizing the contraction of weld deposit between the plastic temperature range and preheat level.

The so-called blue brittle range, 400 to 600 F. is automatically avoided by selection of a preheat temperature of $M_s+100$ F.

The phenomenon of "creep" is used to advantage in obtaining partial stress relief at high preheat temperature.

Distortion can be controlled by the combination of welding sequence, high preheat temperature and frequent stress relief.

Slag inclusions, laps and other manual defects can be minimized by requiring all welding to be performed in the vertical position with high heat input.

It is believed that all metals are weldable with properly selected materials, conditions and techniques.

The successive steps of welding and stress relieving is illustrated in FIGURE 5 of the drawing in which the numerals 1 and 2 designate the parent metal such as a casting or forging, which has been scarfed to a 30° truncated groove A at the site of repair. The casting portions 10 and 20 are then heated by means of a portable furnace, not shown, using a suitable fuel such as charcoal to $M_s+100°$ F. which would be 500° F. to 900° F. Arc welding is then begun in the root in the section designated 1 and proceeds to the point where stress relieving should start, which is 2″ on each side or a total of 4″ for the two 1—1 welded sections. This point is dependent on the size and shape of the repair and on the restraining stresses placed against the weld section. Where free end conditions exist and where shrinkage is not restrained, welding can proceed for several inches of thickness before stress relieving starts.

After the first weld deposit is completed, the entire section is stress relieved in such a way that free end conditions are approached as nearly as possible. This is usually accomplished at about 1150° F., as shown in the diagram of FIGURE 4. The weld section is then inspected by the magnetic particle method which detects any fracture, if present, because shrinkage occurs in the outer fibers of the weld, all internal fibers being in a state of compression due to welding.

The process of welding and subsequent stress relieving is repeated in cycles, as shown by the sections or strata designated 2—2, 3—3 and 4—4, until the weld is completed. It is then stress relieved and inspected one last time. This method of cyclic stress relieving by heating the entire weld section of FIGURE 5 should not be confused with surface heating by torch, which is highly detrimental by causing weld fracture in an otherwise good weld. By cyclic welding, building up of harmful residual stresses at any time is avoided and if welding limits are exceeded, the fractures extend only to the surface that was previously stress relieved, making repair immediate and simple.

The preheat, weld and stress relief cycles, as diagrammatically illustrated in FIGURE 5, are shown in FIGURE 4 of the drawing where the preheat line, so marked, extends to what, on the righthand side of the drawing, is designated the welding range at approximately 720° F. The first weld designated by the numeral 1—1 in FIGURE 5, is stress relieved as shown by the curve extending from the horizontal line at the end of the preheat curve terminating in a flat peak at approximately 1300° F. It then drops back down to 750° F. The number 2 weld is then deposited at 750° F. and again stress relieved to 1300°, as indicated by the second curve having its peak on the 1300° line. Temperature is then again dropped to 750° and the third weld is made, which is again stress relieved at 1300 and brought back to 750° for the fourth weld and so on. The foregoing temperatures, as represented by the curves, are the conditions for SAE 4140 steel, for example.

The above-described cyclic welding is highly successful for repairs formerly made by Thermit welding, there being no limit to the size or shape of the repair. It has been applied on steel castings 24 x 48″ in cross section weighing up to 200 tons. As much as 350 pounds of weld metal has been used to weld a single shaft. In addition to the cyclic stress relief of the weld section as herein described, sections may be welded for several inches of thickness by heavy peening, as by ball peen hammers, to stretch the weld deposits. This is particularly useful where shrinkage is restrained, as in certain shapes and sizes of the section. The peening step is not a substitute for the cyclic stress relieving process but supplements the latter.

The cyclic arc welding process herein described has the advantage of replacing a weaker material, which often contains flaws, with a sound weld material of higher strength. Large fillets can be formed to replace sharp corners and other stress risers. Areas subject to tension can be pre-stressed by peening and pre-stressed in compression to alleviate recurrent failure in tension. The weld can be performed in any position with minimum handling of equipment. Also, design changes can be made to provide reinforcement where desired. Other advantages result from complete stress relief at temperatures from 1100 to 1200° F. at the rate of one hour per inch and slowly cooled to room temperature, which restores the original stress relieved conditions and eliminates possibility of other highly fatigued areas which may have developed during the operating history of the repaired equipment.

I claim:

1. The steps in the method of repairing fractured heavy steel sections by arc welding which consists of removing the fractured portion to form a groove, heating the section to be welded as close as practicable to the lower critical temperature of the steel in said sections, welding the heated section by successive layers of predetermined thickness of hypoeutectoid steel having a carbon content of less than 0.80% and subjecting the entire section to stress relieving temperatures between increments of successive weld deposits for a period of time sufficient to stress relieve the welded steel section.

2. The steps in the method of repairing heavy steel sections by welding as set forth in claim 1 in which the entire section containing the weld is heated to a final stress relieving temperature and cooled slowly to room temperature.

3. The steps in the method of repairing heavy steel sections by welding as set forth in claim 1 in which the fractured sections are scarfed and cut to form a 30° truncated groove and the sections to be welded are heated to a temperature approximately 1000° F. before welding.

4. The step in the method of repairing heavy steel sections by welding as set forth in claim 1 in which the heated sections are welded by successive layers of from substantially 2 to 3″ in thickness and each layer is subjected to stress relieving temperatures of from 1100° to 1200° F.

5. The steps in the method of repairing heavy steel sections by arc welding as set forth in claim 1 in which the section to be welded is heated to approximately 100° F. above the martensite transformation temperature.

6. The step in the method of repairing heavy steel sections by welding as set forth in claim 5 in which the section containing the completed weld is heated to a final stress relieving temperature during a period of one hour per inch of thickness of the steel sections plus the thickness of the weld metal, if it projects beyond the body of the welded steel sections, and slowly cooled to room temperature.

References Cited in the file of this patent

UNITED STATES PATENTS

| | | |
|---|---|---|
| 2,195,256 | Palmer | Mar. 26, 1940 |
| 2,632,944 | Kittelson | Mar. 31, 1953 |
| 2,819,517 | Pursell | Jan. 14, 1958 |